(12) United States Patent
Yanagisawa et al.

(10) Patent No.: US 10,240,639 B2
(45) Date of Patent: Mar. 26, 2019

(54) METHOD OF EQUALLY DISTRIBUTING ROLLING ELEMENTS OF ROLLING BEARING, AND MANUFACTURING METHODS OF ROLLING BEARING, MACHINE AND VEHICLE

(71) Applicant: NSK LTD., Tokyo (JP)

(72) Inventors: Jun Yanagisawa, Fujisawa (JP); Kouhei Dobashi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/074,990

(22) PCT Filed: Jan. 4, 2018

(86) PCT No.: PCT/JP2018/000005
§ 371 (c)(1),
(2) Date: Aug. 2, 2018

(87) PCT Pub. No.: WO2018/128174
PCT Pub. Date: Jul. 12, 2018

(65) Prior Publication Data
US 2019/0040913 A1   Feb. 7, 2019

(30) Foreign Application Priority Data
Jan. 5, 2017   (JP) .................. 2017-000389

(51) Int. Cl.
*F16C 43/06* (2006.01)
*F16C 33/00* (2006.01)
*B23P 15/00* (2006.01)

(52) U.S. Cl.
CPC .......... *F16C 43/065* (2013.01); *B23P 15/003* (2013.01); *F16C 33/00* (2013.01)

(58) Field of Classification Search
CPC ......... F16C 33/00; F16C 43/06–43/065; F16C 43/04; Y10T 29/4968; Y10T 29/49682;
(Continued)

(56) References Cited

U.S. PATENT DOCUMENTS 2,931,095 A * 4/1960 Esken ............... F16C 43/06
29/724
3,135,041 A * 6/1964 Knobel ............. F16C 43/04
29/724

(Continued)

FOREIGN PATENT DOCUMENTS

JP    52-114843 A      9/1977
JP    58196939 A  * 11/1983  ............. F16C 43/04

(Continued)

OTHER PUBLICATIONS

International Search Report (PCT/ISA/210), issued by International Searching Authority in corresponding International Application No. PCT/JP2018/000005, dated Mar. 20, 2018.

(Continued)

*Primary Examiner* — Matthew P Travers
(74) *Attorney, Agent, or Firm* — Sughrue Mion, PLLC

(57) ABSTRACT

When conveying a rolling bearing from a ball collection operation position to a block division operation position or/and when conveying the rolling bearing from the block division operation position to an equal distribution operation position, a positional misalignment prevention member is inserted into a circumferential gap existing between rolling elements, so that the rolling elements are prevented from rolling and being thus dispersedly scattered and positionally misaligned.

6 Claims, 12 Drawing Sheets

(58) Field of Classification Search
CPC ......... Y10T 29/49686; Y10T 29/49636; Y10T 29/49679; B23P 15/003
See application file for complete search history.

(56) References Cited

U.S. PATENT DOCUMENTS

| | | | | |
|---|---|---|---|---|
| 3,148,437 | A * | 9/1964 | Busch | F16C 43/04 29/442 |
| 3,340,590 | A * | 9/1967 | Reynolds | F16C 43/06 29/714 |
| 3,382,016 | A * | 5/1968 | Schmidt | F16C 19/466 384/575 |
| 5,421,088 | A * | 6/1995 | Kawamura | F16C 43/06 29/898.062 |
| 5,678,310 | A * | 10/1997 | Chiba | F16C 43/06 29/898.061 |
| 6,206,574 | B1 * | 3/2001 | Sonoda | F16C 43/06 384/507 |
| 6,510,609 | B2 * | 1/2003 | Chiba | F16C 43/06 29/464 |
| 2001/0020330 | A1 * | 9/2001 | Chiba | F16C 43/06 29/898.062 |
| 2011/0154666 | A1 * | 6/2011 | Friedl | F16C 43/06 29/898.06 |
| 2017/0314622 | A1 * | 11/2017 | Akanuma | B25J 9/1687 |

FOREIGN PATENT DOCUMENTS

| | | | | |
|---|---|---|---|---|
| JP | 02266113 A | * | 10/1990 | ............. F16C 43/04 |
| JP | 9-225757 A | | 9/1997 | |
| JP | 2008-200789 A | | 9/2008 | |
| JP | 2008202606 A | * | 9/2008 | ............. F16C 43/04 |

OTHER PUBLICATIONS

Written Opinion (PCT/ISA/237) issued by the International Searching Authority in corresponding International Application No. PCT/JP2018/000005, dated Mar. 20, 2018.

* cited by examiner

METHOD OF EQUALLY DISTRIBUTING ROLLING ELEMENTS OF ROLLING BEARING, AND MANUFACTURING METHODS OF ROLLING BEARING, MACHINE AND VEHICLE

TECHNICAL FIELD

The present invention relates to a method of equally distributing rolling elements of a rolling bearing, and manufacturing methods of a rolling bearing, a machine and a vehicle.

RELATED ART

For example, a rolling bearing such as a ball bearing 1 shown in FIG. 1 is incorporated to a rotation support part of a variety of mechanical devices. When assembling the ball bearing 1, a plurality of rolling elements 6, 6 is mounted between an inner ring raceway 3 provided on an outer peripheral surface of an inner ring 2 and an outer ring raceway 5 provided on an inner peripheral surface of an outer ring 4, and the rolling elements 6, 6 are then arranged at equal intervals (equally distributed) in a circumferential direction. Then, a pair of cage elements 8, 8 is inserted from both axial sides into a rolling element mounting space 7 between the inner ring raceway 3 and the outer ring raceway 5, and is coupled by a plurality of rivets to configure a cage 9, so that the rolling elements 6, 6 are rollably held.

In the state where the plurality of rolling elements 6, 6 is mounted in the rolling element mounting space 7, the rolling elements 6, 6 are unequally spaced in the circumferential direction in the rolling element mounting space 7. Patent Document 1 discloses an example of a method of arranging the rolling elements 6, 6 at equal intervals in the circumferential direction. According to this method, the plurality of rolling elements (balls) mounted in the rolling element mounting space is once collected to one circumferential place in the rolling element mounting space by using a pair of arms, and is then divided into a plurality of blocks and arranged at a plurality of circumferential places in the rolling element mounting space. Then, a comb-shaped cylindrical ball distribution jig is axially inserted into the rolling element mounting space, so that the rolling elements divided into blocks each including the plurality of rolling elements are arranged at equal intervals at the plurality of circumferential places.

According to the method disclosed in Patent Document 1, since it is possible to shorten axial lengths of teeth (operation arrows) configuring the ball distribution jig, it is possible to prevent wear and deformation of the ball distribution jig. Also, since it is possible to reduce an insertion load upon the insertion of the ball distribution jig into the rolling element mounting space, it is possible to efficiently prevent the damage of the rolling elements and the deformation of the ball distribution jig.

CITATION LIST

Patent Documents

Patent Document 1: JP-A-2008-200789

SUMMARY OF THE INVENTION

Problems to be Solved by the Invention

According to the method disclosed in Patent Document 1, there is a room for further improvement, from a standpoint of improving productivity (assemblability) of the rolling bearing. That is, according to the method disclosed in Patent Document 1, on an assembly line of the rolling bearing, it is necessary to perform all of the operation (ball collection operation) of collecting the rolling elements to one circumferential place in the rolling element mounting space, the operation (block division operation) of dividing the rolling elements into blocks each including the plurality of rolling elements, and the operation (equal distribution operation) of arranging the rolling elements at equal intervals at the plurality of circumferential places, at one operation position (in the same assembly process). For this reason, an operation amount in the process of arranging the rolling elements unequally spaced in the rolling element mounting space, at equal intervals increases, and the corresponding process becomes a bottle neck on the assembly line of the rolling bearing, so that the assemblability of the rolling bearing may be deteriorated.

The present invention has been made in view of the above situations, and an object thereof is to improve a method of equally distributing rolling elements of a rolling bearing, and manufacturing methods of a rolling bearing, a machine, and a vehicle capable of improving assemblability of a rolling bearing.

Means for Solving the Problems

A method of equally distributing rolling elements of a rolling bearing of the present invention is a method for arranging a plurality of rolling elements at equal intervals at a plurality of circumferential places in a rolling element mounting space between an inner ring raceway provided on an outer peripheral surface of an inner ring and an outer ring raceway provided on an inner peripheral surface of an outer ring.

In a first aspect of the present invention, there is provided a method of equally distributing rolling elements of a rolling bearing including collecting the rolling elements to one circumferential place in the rolling element mounting space, and conveying the rolling bearing to a next process in a state where a positional misalignment prevention member is inserted in a circumferential gap existing between the rolling elements, which are located at both circumferential ends, at both the circumferential ends of the rolling elements collected to one circumferential place in the rolling element mounting space.

In a second aspect of the present invention, there is provided a method of equally distributing rolling elements of a rolling bearing including dividing the rolling elements into blocks each including a plurality of rolling elements and arranging the same at a plurality of circumferential places in the rolling element mounting space, and conveying the rolling bearing to a next process in a state where a positional misalignment prevention member is inserted in a circumferential gap existing between the rolling elements located at both circumferential ends of each block.

When implementing the method of equally distributing rolling elements of a rolling bearing of the present invention, the first aspect and the second aspect may be implemented at the same time. In the meantime, the positional misalignment prevention member that is to be used in the first aspect and the positional misalignment prevention member that is to be used in the second aspect have different shapes.

The present invention can be preferably applied to a ball bearing in which balls are used as the rolling elements. Alternatively, the present invention can also be applied to a cylindrical roller bearing in which a cylindrical roller (including a needle) is used as the rolling element or a tapered roller bearing in which a tapered roller is used as the rolling element.

Also, the method of equally distributing rolling elements of a rolling bearing can be applied to a manufacturing method of a rolling bearing, a manufacturing method of a machine, and a manufacturing method of a vehicle.

Effects of the Invention

According to the method of equally distributing rolling elements of a rolling bearing, and the manufacturing methods of the rolling bearing, the machine and the vehicle of the present invention, it is possible to easily improve the assemblability of the rolling bearing.

DETAILED DESCRIPTION OF EMBODIMENTS

Figure 1:
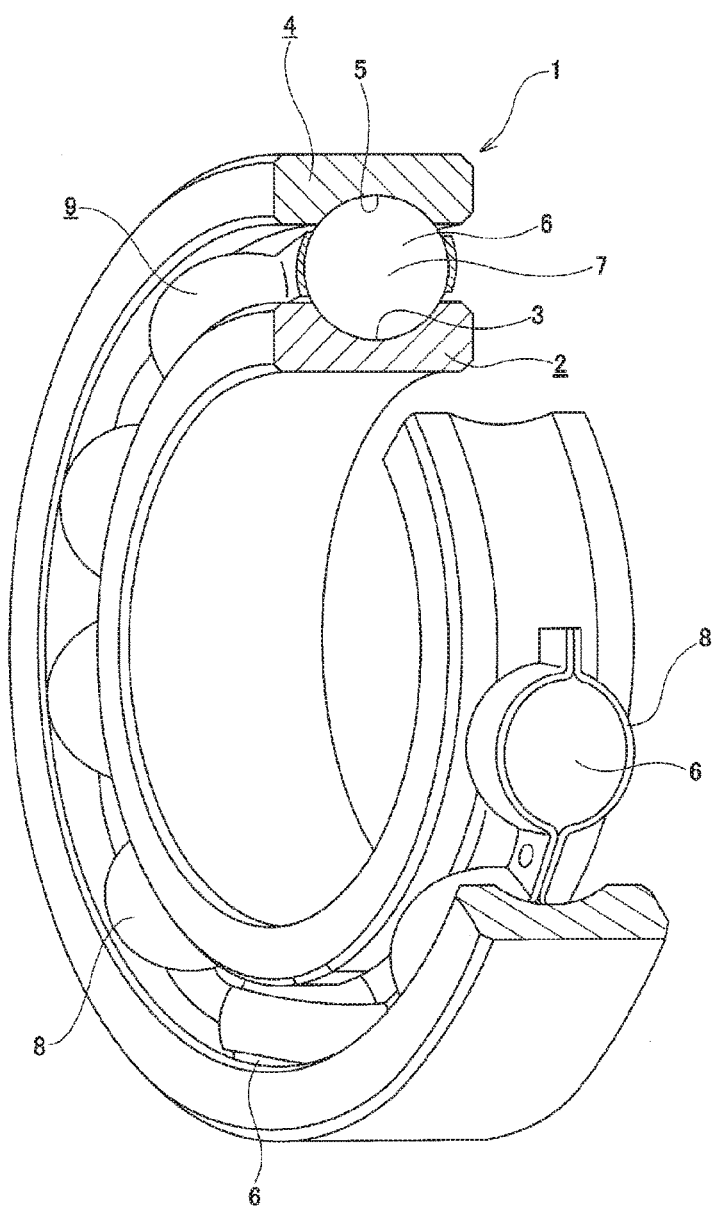
FIG. 1 is a partially cut perspective view depicting a ball bearing, which is a target of an example of an embodiment of the present invention.

FIGS. 1 to 13B depict an example of an embodiment of the present invention. As shown in FIG. 1, a ball bearing 1, which is a target of the example, is configured by mounting a plurality of rolling elements (balls) 6, 6 between an inner ring 2 and an outer ring 4 arranged coaxially with each other. The inner ring 2 has an inner ring raceway 3 provided at an axially intermediate part of an outer peripheral surface thereof. The outer ring 4 has an outer ring raceway 5 provided at an axially intermediate part of an inner peripheral surface thereof. The rolling elements 6, 6 are rollably arranged between the inner ring raceway 3 and the outer ring raceway 5 with being held by a cage 9. The cage 9 is a corrugated cage and has a pair of cage elements 8, 8, each of which has an annular disk shape and is bent into a wave form in a circumferential direction, coupled by a plurality of rivets. As the cage, a crown-shaped cage, which has an annular rim part and a plurality of column parts protruding axially from one axial surface of the rim part and in which a part having three surfaces surrounded by one axial surface of the rim part and circumferential side surfaces of the column parts adjacent to each other in a circumferential direction is configured as a pocket for holding a rolling element, may also be used.

The ball bearing 1 as described above is assembled by a transfer machine in which a series of assembling operations are incorporated in one assembly line. Specifically, a plurality of operation positions $P_0$ to $P_3$ . . . is provided at predetermined intervals along the assembly line on an operating table 10. While conveying the ball bearing 1 put at each of the operation positions $P_0$ to $P_3$ . . . to the next operation positions $P_1$ to $P_3$ . . . by a conveyance mechanism 11, each process of the assembling operation is implemented at each of the operation positions $P_0$ to $P_3$ . . . , so that the ball bearing 1 is assembled. The parts, which match the respective operation positions $P_0$ to $P_3$ . . . , of the operating table 10 are formed with circular holes 20a to 20d vertically penetrating the operating table 10. An inner diameter of each of the circular holes 20a to 20d is made smaller than an outer diameter of the outer ring 4 and larger than an inner diameter of the outer ring 4 (a cylindrical surface existing at a part deviating from the outer ring raceway 5). The conveyance mechanism 11 has a plurality of conveyance arms 12a to 12d provided at predetermined intervals along the assembly line. When conveying the ball bearing 1, the conveyance mechanism 11 is first displaced in a direction of coming close to the operating table 10. Thereby, the ball bearing 1 is arranged between leading end portions of the conveyance arms 12a to 12d adjacent to each other. Then, the conveyance mechanism 11 is slid along the assembly line by a predetermined amount, so that the outer peripheral surface of (the outer ring 4 of) the ball bearing 1 is pushed and moved by a side surface of the leading end portion of each of the conveyance arms 12a to 12d, which is located upstream of the assembly line, of the adjacent conveyance arms 12a to 12d. Thereby, the ball bearing 1 is conveyed to the next operation positions $P_1$ to $P_3$ . . . . In FIGS. 2A to 9, regarding the series of assembling operations of assembling the ball bearing 1, only parts relating to each process for arranging the rolling elements 6, 6, which have been unequally spaced in the rolling element mounting space 7 between the inner ring raceway 3 and the outer ring raceway 5, at equal intervals are shown. In FIGS. 2A to 9, for convenience sake, only one ball bearing 1 is shown. Actually, however, the ball bearing 1 is respectively arranged at each of the plurality of operation positions $P_0$ to $P_3$ . . . , and the assembling process corresponding to the operation positions $P_0$ to $P_3$ . . . is implemented for each of the ball bearings 1.

[Outline of Assembling Operation]

In this example, the rolling elements 6, 6 are first mounted in the rolling element mounting space 7, and the rolling bearing 1 is placed at an initial position $P_0$. In this state, the rolling elements 6, 6 are unequally spaced in the circumferential direction in the rolling element mounting space 7. Then, at a ball collection operation position $P_1$, the rolling elements 6, 6 unequally spaced in the rolling element mounting space 7 are collected to a position of one circumferential place in the rolling element mounting space 7. Then, the ball bearing 1 is conveyed (moved) to a block division operation position $P_2$, and the rolling elements 6, 6 collected at the position of one circumferential place are divided into a plurality of blocks, and are arranged at a plurality of circumferential places in the rolling element mounting space 7. Thereafter, the ball bearing 1 is conveyed to an equal distribution operation position $P_3$, and the rolling elements 6, 6 divided into the blocks are arranged at equal intervals at the plurality of circumferential places in the rolling element mounting space 7. Particularly, in this example, when conveying the ball bearing 1 from the ball collection operation position $P_1$ to the block division operation position $P_2$, and when conveying the ball bearing 1 from the block division operation position $P_2$ to the equal distribution operation position $P_3$, positional misalignment prevention members 13a, 13b are axially inserted into circumferential gaps between the rolling elements 6, 6. Thereby, the rolling elements 6, 6 are prevented from being dispersedly scattered and positionally misaligned. In the below, a method of arranging the rolling elements 6, 6 unequally spaced in the rolling element mounting space 7 at equal intervals is described in detail with reference to FIGS. 2A to 9.

When assembling the ball bearing 1, the inner ring 2 is first arranged at a radially inner side of the outer ring 4 in a state where a central axis of the inner ring 2 is offset relative to a central axis of the outer ring 4. In this state, the plurality of (seven, in the example of FIGS. 2A to 2F) rolling elements 6, 6 is introduced from a radially large dimension part of an axial opening of a substantially partially cylindrical space (a substantially crescent-shaped space, as seen from the axial direction) between the inner ring raceway 3 and the outer ring raceway 5 into the substantially partially cylindrical space. Then, the central axis of the inner ring 2 and the central axis of the outer ring 4 are made to coincide with each other. In this stage, the rolling elements 6, 6 are unequally spaced in the rolling element mounting space 7 between the inner ring raceway 3 and the outer ring raceway 5. The ball bearing 1 of which the rolling elements 6, 6 are unequally spaced in the rolling element mounting space 7 is placed at the initial position $P_0$ on the operating table 10.

Then, the ball bearing 1 placed at the initial position $P_0$ is conveyed to the ball collection operation position $P_1$ on the operating table 10 by the conveyance mechanism 11. To this end, the conveyance mechanism 11 is displaced in the direction of coming close to the operating table 10, and the leading end portions of the adjacent conveyance arms 12a, 12b are arranged at both sides of the ball bearing 1 placed at the initial position $P_0$ (the ball bearing 1 is arranged between the leading end portions of the adjacent conveyance arms 12a. 12b). In this state, the conveyance mechanism 11 is slid in a direction shown with the arrow $A_1$ in FIG. 3 (a direction facing toward a downstream side of the assembly line) along the assembly line by a predetermined amount, thereby pushing and moving the outer peripheral surface of the ball bearing 1 by the side surface of the leading end portion of the conveyance arms 12a, which is located upstream of the assembly line, of the adjacent conveyance arms 12a, 12b. Then, the ball bearing 1 is conveyed to the ball collection operation position $P_1$. After conveying the ball bearing 1 to the ball collection operation position $P_1$, as shown with the arrow $A_2$ in FIG. 4, the conveyance mechanism 11 is displaced upward and the conveyance arms 12a. 12b are retreated from both sides of the ball bearing 1. Thereafter, the conveyance mechanism 11 is further displaced in a direction of separating from the operating table 10 with respect to a direction perpendicular to the assembly line and is thus retreated from the operating table 10.

Figure 2A:
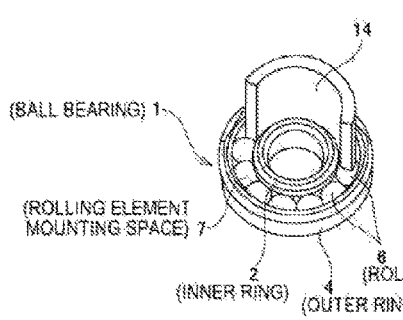
FIGS. 2A to 2F are perspective views depicting the example of the embodiment of the present invention, in process order with the ball bearing being taken out.
Figure 2B:
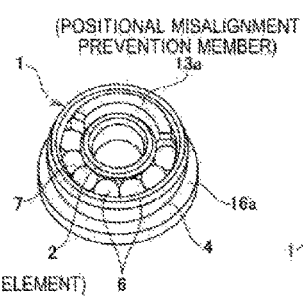
Figure 5:
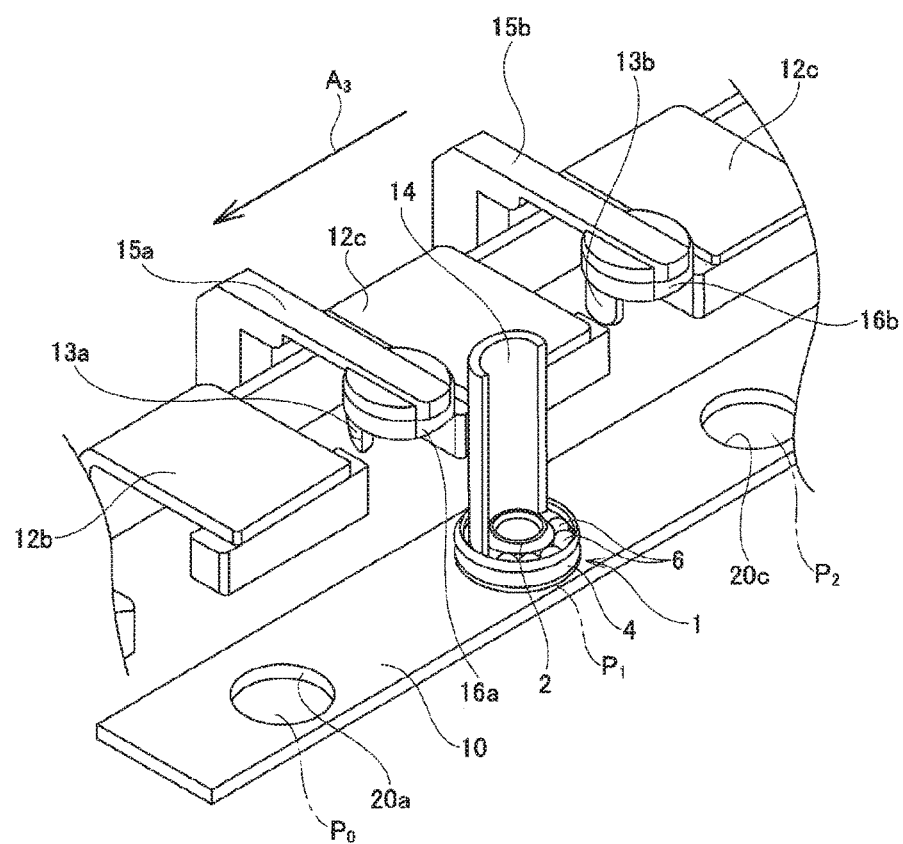
FIG. 5 is a perspective view depicting an aspect in which a ball collection process is implemented.
Figure 10:
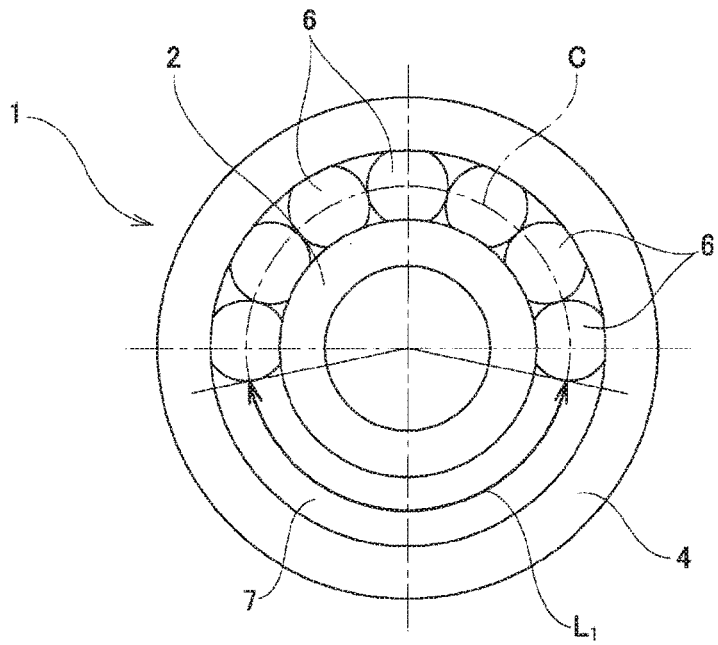
FIG. 10 is a plan view of the ball bearing, depicting a state in which the rolling elements are collected to one circumferential place in a rolling element mounting space.

Then, a ball collection process of collecting the rolling elements 6, 6 unequally spaced in the rolling element mounting space 7 of the ball bearing 1 to one circumferential place in the rolling element mounting space 7 is implemented. As shown in FIGS. 2A and 5, the ball collection process is performed by inserting a partially cylindrical ball collection jig 14 into the rolling element mounting space 7 in the axial direction (from above, in the shown example). A circumferential width dimension of the ball collection jig 14 is substantially the same as a circumferential length $L_1$ of a circumferential gap between the rolling elements 6, 6 located at both circumferential ends thereof in the state where the rolling elements 6, 6 are collected to one circumferential place. In the state where the rolling elements 6, 6 are collected to one circumferential place, the circumferential length $L_1$ of the circumferential gap between the rolling elements 6, 6 located at both the circumferential ends is a circumferential length on a pitch circle C of the rolling elements 6, 6, as shown in FIG. 10. A leading end face (lower end face) of the ball collection jig 14 is configured as an inclined surface (a mountain shape) having a circumferentially central part most protruding and inclined upward toward both circumferential sides thereof. In addition to the mountain shape, the leading end face of the ball collection jig 14 may be configured as an inclined surface (a shape inclined in one direction) having one circumferential end side most protruding and inclined upward toward the other circumferential end side. In any shape, when the ball collection jig 14 is inserted into the rolling element mounting space 7 from above until the leading end portion of the ball collection jig 14 protrudes downward beyond a lower surface of the operating table 10 through the circular hole 20b, the rolling elements 6, 6 are moved in the rolling element mounting space 7. Thereby, the rolling elements 6, 6 are collected to one circumferential place in the rolling element mounting space 7. When the rolling elements 6, 6 are collected to one circumferential place in the rolling element mounting space 7, the ball collection jig 14 is pulled out from the rolling element mounting space 7. The conveyance mechanism 11 is moved in a direction (a direction facing toward an upstream side of the assembly line) shown with the arrow $A_3$ in FIG. 5 along the assembly line, and is thus returned to the original position.

Subsequently, the ball bearing 1 is conveyed from the ball collection operation position $P_1$ to the block division operation position $P_2$ by the conveyance mechanism 11. In this example, at both the circumferential ends of the rolling elements 6, 6 collected to one circumferential place in the rolling element mounting space 7, a partially cylindrical positional misalignment prevention member 13a is inserted into the circumferential gap between the rolling elements 6, 6 located at both the circumferential ends, instead of the ball collection jig 14. In this state, the ball bearing 1 is conveyed from the ball collection operation position $P_1$ to the block division operation position $P_2$. To this end, a support arm 15a is provided between the conveyance arms 12b, 12c of the conveyance mechanism 11, and a leading end portion of the support arm 15a is provided with an annular disk part 16a. The annular disk part 16a is configured so that it is located above a part between the leading end portions of the conveyance arms 12b, 12c. The positional misalignment prevention member 13a is formed to protrude downward from a lower surface of the annular disk part 16a. A circumferential width dimension of the positional misalignment prevention member 13a is substantially the same as the circumferential width dimension of the ball collection jig 14.

Figure 6:
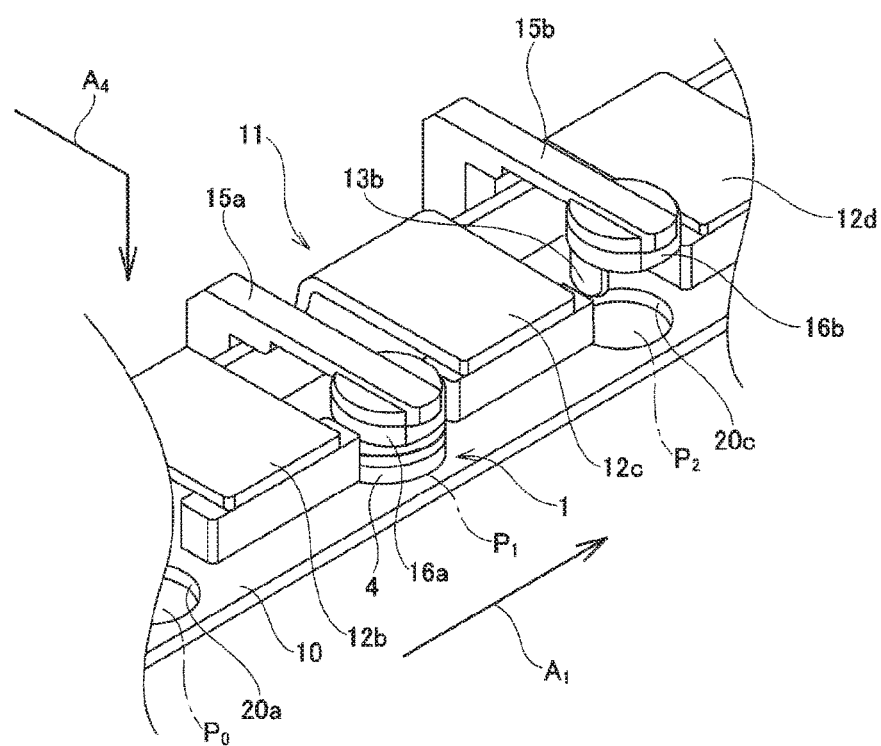
FIG. 6 is a perspective view depicting an aspect in which the ball bearing is conveyed to a block division operation position with a positional misalignment prevention member being inserted in a circumferential gap existing between rolling elements.
Figure 7:
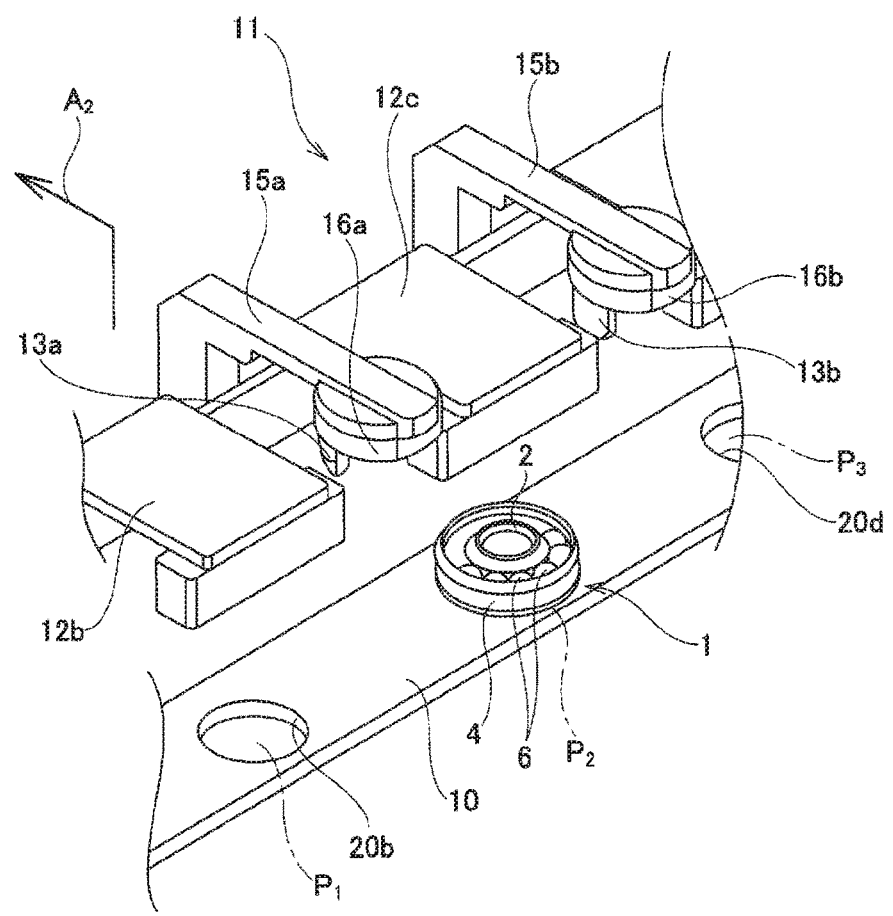
FIG. 7 is a perspective view depicting an aspect in which the conveyance mechanism is retreated after the ball bearing is conveyed to the block division operation position.

When conveying the ball bearing 1 from the ball collection operation position $P_1$ to the block division operation position $P_2$, the conveyance mechanism 11 is first displaced in the direction of coming close to the operating table 10 with respect to the direction perpendicular to the assembly line and is then displaced downward, as shown with the arrow $A_4$ in FIG. 6. Thereby, the leading end portions of the conveyance arms 12b, 12c of the conveyance mechanism 11 are arranged at both sides of the ball bearing 1 placed at the ball collection operation position $P_1$ (the ball bearing 1 is arranged between the leading end portions of the adjacent conveyance arms 12b, 12c). Also, the positional misalignment prevention member 13a is inserted into the circumferential gap, which exists between the rolling elements 6, 6 located at both the circumferential ends of the rolling elements 6, 6 collected to one circumferential place in the rolling element mounting space 7, from above so that the circumferential gap is to be filled.

Then, the conveyance mechanism 11 is slid in the direction shown with the arrow $A_1$ in FIG. 6 along the assembly line by a predetermined amount, thereby pushing and moving the outer peripheral surface of the ball bearing 1 by the side surface of the leading end portion of the conveyance arm 12b, which is located upstream of the assembly line, of the adjacent conveyance arms 12b, 12c. Then, the ball bearing 1 is conveyed to the block division operation position $P_2$. After conveying the ball bearing 1 to the block division operation position $P_2$, the conveyance mechanism 11 is displaced upward, as shown with the arrow $A_2$ in FIG. 7, so that the positional misalignment prevention member 13a is pulled out from the circumferential gap. Also, the conveyance arms 12b, 12c are retreated from both sides of the ball bearing 1, and the conveyance mechanism 11 is further displaced in the direction of separating from the operating table 10 with respect to the direction perpendicular to the assembly line and is thus retreated from the operating table 10.

Figure 2C:
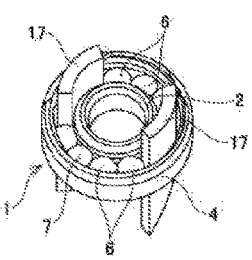
Figure 2D:
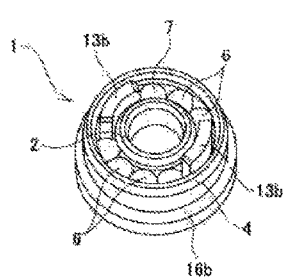
Figure 8:
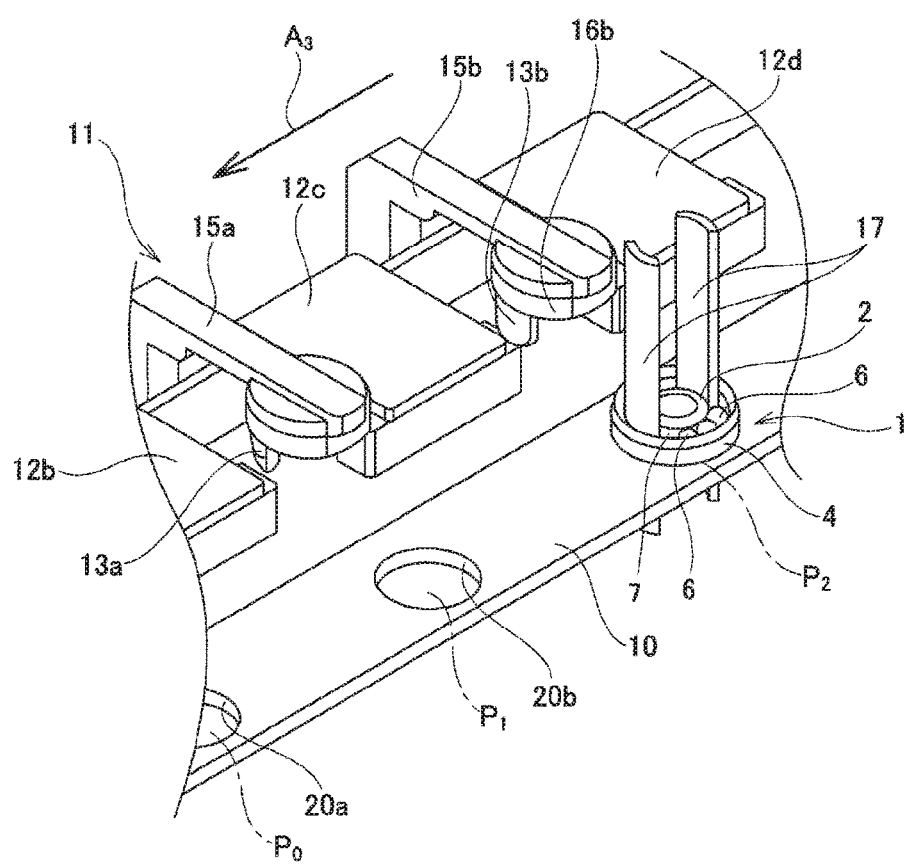
FIG. 8 is a perspective view depicting an aspect in which a block division process is implemented.
Figure 11:
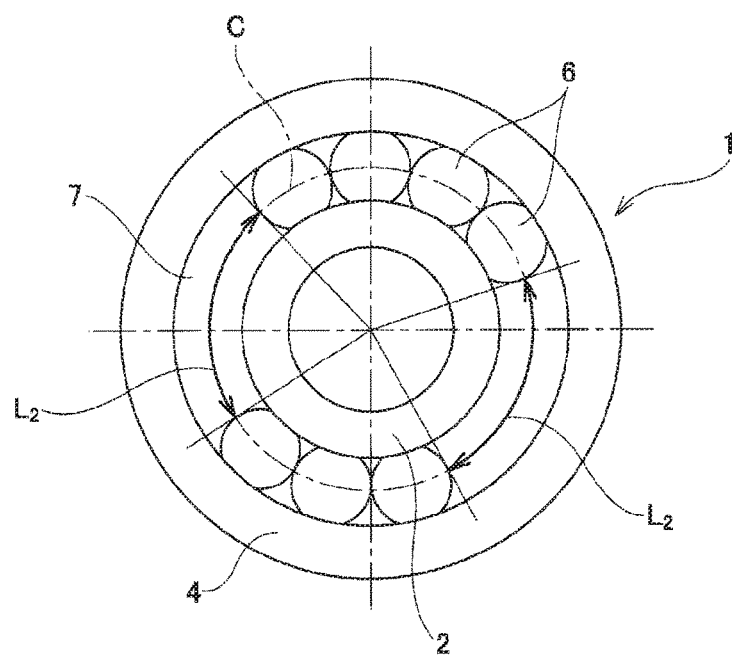
FIG. 11 is a plan view of the ball bearing, depicting a state in which the rolling elements are divided into a plurality of blocks at a plurality of circumferential places in the rolling element mounting space.

Then, a block division process of dividing and arranging the rolling elements 6, 6 collected to one circumferential place in the rolling element mounting space 7 into blocks each including a plurality of rolling elements 6 (a block including three rolling elements 6 and a block including four rolling elements 6, in the shown example) at a plurality of circumferential places in the rolling element mounting space 7 is implemented. As shown in FIGS. 2C and 8, the block division process is performed by inserting a pair of block division jigs 17, 17 each having a partially cylindrical shape into the rolling element mounting space 7 from above. A circumferential width dimension of each of the pair of block division jigs 17, 17 is substantially the same as each of circumferential lengths $L_2$, $L_2$ of circumferential gaps between the rolling elements 6, 6 located at both the circumferential ends of each block in the state where the rolling elements 6, 6 are divided and arranged into blocks each including the plurality of rolling elements at the plurality of circumferential places in the rolling element mounting space 7. The rolling elements 6, 6 are divided and arranged into the blocks each including the plurality of rolling elements 6 at the plurality of circumferential places in the rolling element mounting space 7. In this state, each of the circumferential length $L_2$, $L_2$ of the circumferential gaps between the rolling elements 6, 6 located at both the circumferential ends of each block is a circumferential length on the pitch circle C of the rolling elements 6, 6, as shown in FIG. 11. In the shown example, the circumferential lengths $L_2$, $L_2$ (≈the circumferential dimensions of the pair of block division jigs 17, 17) of the circumferential gaps between the rolling elements 6, 6 located at both the circumferential ends of each block are the same. On the other hand, the circumferential lengths of the respective circumferential gaps may be made to be different from each other. A leading end face (lower surface) of one block division jig 17 of the pair of block division jigs 17, 17 is configured as an inclined surface inclined upward from one circumferential side toward the other circumferential side. Also, a leading end face (lower surface) of the other block division jig 17 is configured as an inclined surface inclined upward from the other circumferential side toward one circumferential side. Therefore, when the pair of block division jigs 17, 17 is inserted into the rolling element mounting space 7 from above until the leading end portions of the pair of block division jigs 17, 17 protrude downward beyond the lower surface of the operating table 10 through the circular hole 20c, the rolling elements 6, 6 are moved in the rolling element mounting space 7. Thereby, the rolling elements 6, 6 are divided into blocks each including the plurality of rolling elements 6 (the block including three rolling elements 6 and the block including four rolling elements 6, in the shown example) at the plurality of circumferential places in the rolling element mounting space 7. When a total number of the rolling elements 6, 6 is an even number, the rolling elements are preferably divided into blocks each including the same number of rolling elements 6.

Figure 12A:
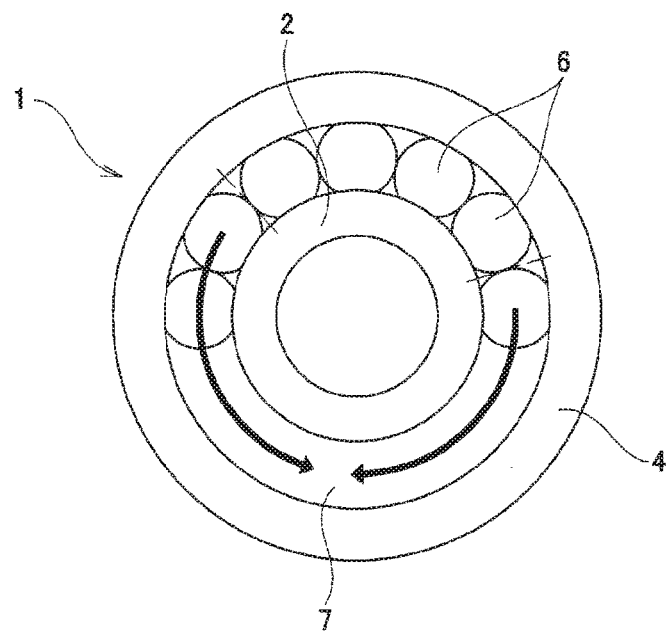
FIGS. 12A and 12B are plan views for illustrating a method of dividing the rolling elements, which have been collected to one circumferential place in the rolling element mounting space, into blocks each including the plurality of rolling elements.
Figure 12B:
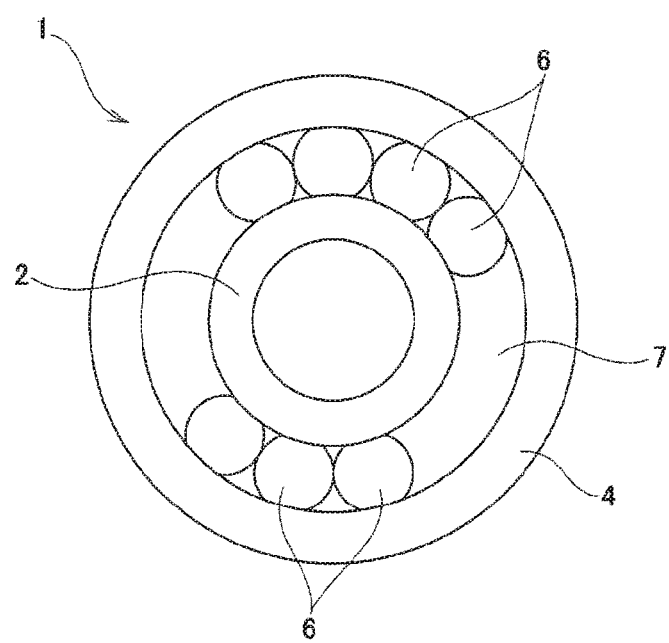
Figure 13A:
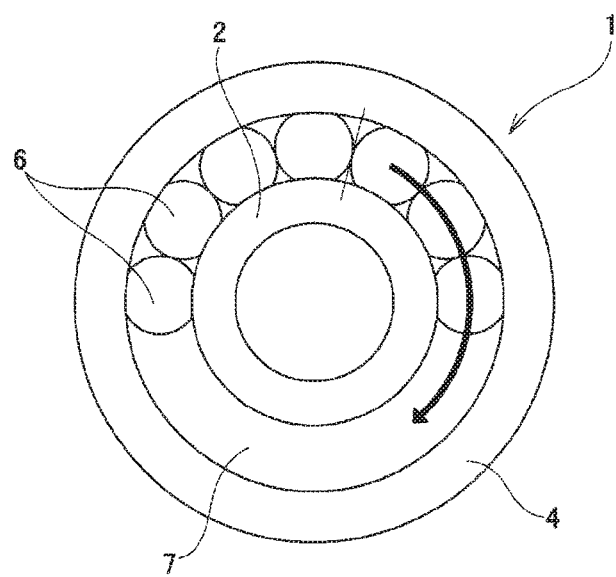
FIGS. 13A and 13B are plan view depicting another example of the method of dividing the rolling elements, which have been collected to one circumferential place in the rolling element mounting space, into blocks each including the plurality of rolling elements.
Figure 13B:
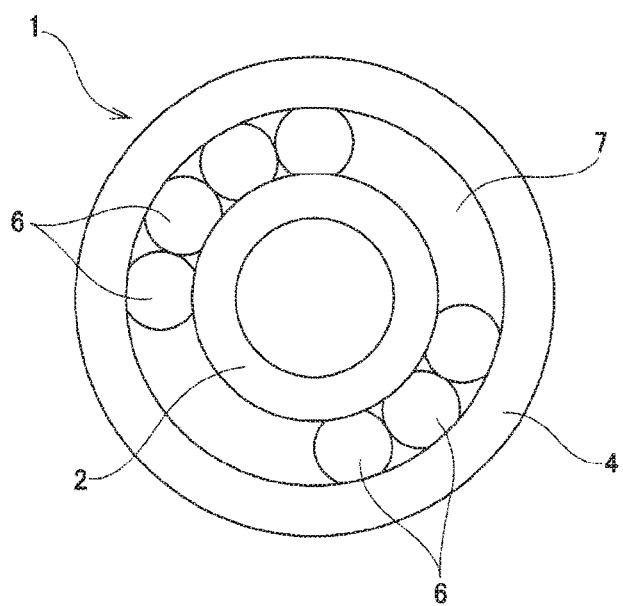

In this example, circumferential phases of the insertion positions of the pair of block division jigs 17, 17 are controlled. Thereby, as shown in FIGS. 12A to 12B, one or more (in the shown example, one from one circumferential side and two from the other circumferential side) of the rolling elements 6, 6 collected to one circumferential place in the rolling element mounting space 7 are moved from each of both the circumferential sides, so that the rolling elements 6, 6 are divided into the blocks each including the plurality of rolling elements 6. When the total number of the rolling elements 6, 6 is an even number, the same number of the rolling elements are preferably moved from each of both the circumferential sides. Thereby, the force of inserting the pair of block division jigs 17, 17 into the rolling element mounting space 7 from above is suppressed. That is, as shown in FIGS. 13A to 13B, when some of the rolling elements 6, 6 collected to one circumferential place in the rolling element mounting space 7 are moved from only one circumferential side to divide the rolling elements 6, 6 into blocks each including the plurality of rolling elements 6, it is necessary to move the rolling elements 6, 6 so that the rolling elements are to be lined in series in the circumferential direction. As a result, the sliding resistance of the rolling elements 6, 6 increases, so that the force of inserting the pair of block division jigs 17, 17 into the rolling element mounting space 7 from above is increased. In contrast, in this example, one or more of the rolling elements 6, 6 collected to one circumferential place in the rolling element mounting space 7 are moved from each of both the circumferential sides, so that the rolling elements 6, 6 are divided blocks each including the plurality of rolling elements 6. Therefore, it is possible to suppress the force of inserting the pair of block division jigs 17, 17 into the rolling element mounting space 7 from above. In the meantime, when the force of inserting the pair of block division jigs 17, 17 is sufficiently high, some of the rolling elements 6, 6 collected to one circumferential place in the rolling element mounting space 7 may be moved from only one circumferential side to divide the rolling elements 6, 6 into blocks each including the plurality of rolling elements 6.

When the rolling elements 6, 6 are divided into blocks each including the plurality of rolling elements 6 at the plurality of circumferential places in the rolling element mounting space 7, the pair of block division jigs 17, 17 is thereafter pulled out from the rolling element mounting space 7. Also, the conveyance mechanism 11 is moved in the direction shown with the arrow $A_3$ in FIG. 8 along the assembly line, and is thus returned to the original position thereof.

In the shown example, the plurality of rolling elements 6, 6 is divided into blocks each including the plurality of rolling elements 6 at the two circumferential places by the pair of block division jigs 17, 17. However, when three or more of the block division jigs are used, the rolling elements 6, 6 can be divided into the three or more blocks.

Subsequently, the ball bearing 1 is conveyed from the block division operation position $P_2$ shown in FIG. 9 to the equal distribution operation position $P_3$ by the conveyance mechanism 11. In this example, the positional misalignment prevention members 13b, 13b each having a partially circular arc shape are inserted, instead of the pair of block division jigs 17, 17, into the circumferential gaps between the rolling elements 6, 6, which are located at both the circumferential ends of each block, of the rolling elements 6, 6 divided into blocks each including the plurality of rolling elements at the plurality of circumferential places in the rolling element mounting space 7. In this state, the ball bearing 1 is conveyed from the block division operation position $P_2$ to the equal distribution operation position $P_3$. To this end, a support arm 15b is provided between the adjacent conveyance arms 12c, 12d of the conveyance mechanism 11, and a leading end portion of the support arm 15b is provided with an annular disk part 16b. The annular disk part 16b is configured to be located above a part between the leading end portions of the conveyance arms 12c, 12d. The positional misalignment prevention members 13b, 13b are formed to protrude downward from a plurality of circumferential places (in this example, two places substantially opposite to each other in the radial direction) of an outer peripheral edge portion of a lower surface of the annular disk part 16b. A circumferential width dimension of each of the positional misalignment prevention members 13b, 13b is substantially the same as the circumferential width dimension of each of the pair of block division jigs 17, 17.

Figure 9:
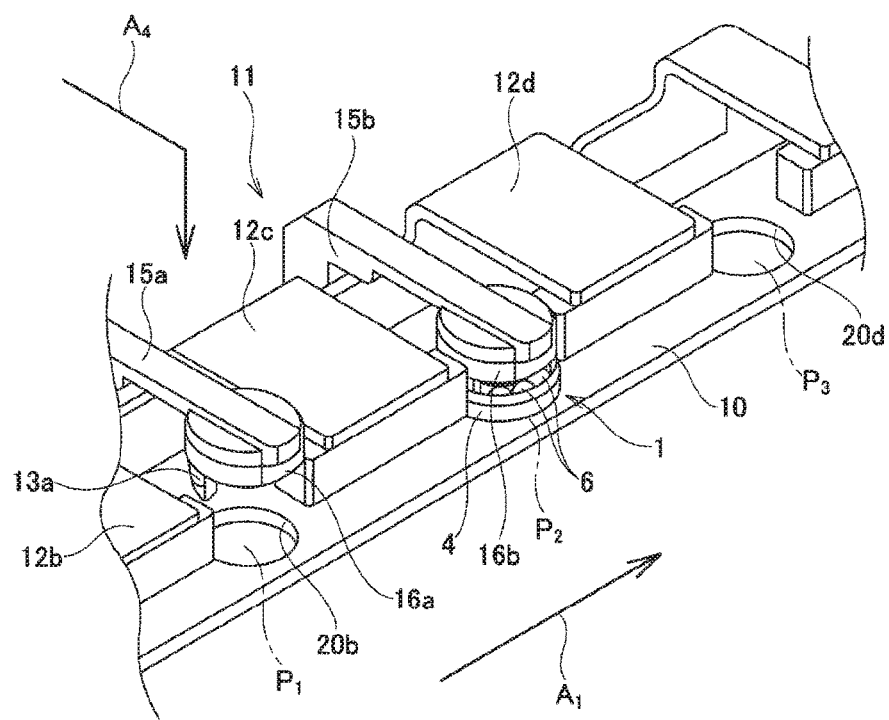
FIG. 9 is a perspective view depicting an aspect in which the ball bearing is conveyed to an equal distribution operation position with the positional misalignment prevention member being inserted in the circumferential gap existing between the rolling elements.

When moving the ball bearing 1 from the block division operation position $P_2$ to the equal distribution operation position $P_3$, the conveyance mechanism 11 is first displaced in the direction of coming close to the operating table 10 with respect to the direction perpendicular to the assembly line and is then displaced downward, as shown with the arrow $A_4$ in FIG. 9. Thereby, the leading end portions of the conveyance arms 12c, 12d of the conveyance mechanism 11 are arranged at both sides of the ball bearing 1 placed at the block division operation position $P_2$ (the ball bearing 1 is arranged between the leading end portions of the adjacent conveyance arms 12c, 12d). Also, the positional misalignment prevention members 13b, 13b are inserted into the circumferential gaps, which exist between the rolling elements 6, 6 located at both the circumferential ends of each block, from above so that the respective circumferential gaps are to be filled.

Then, the conveyance mechanism 11 is slid in the direction shown with the arrow $A_1$ in FIG. 9 along the assembly line by a predetermined amount. Thereby, the outer peripheral surface of the ball bearing 1 is pushed and moved along the operating table 10 by the side surface of the leading end portion of the conveyance arm 12c, which is located upstream of the assembly line, of the adjacent conveyance arms 12c, 12d, so that the ball bearing 1 is conveyed to the equal distribution operation position $P_3$. After conveying the ball bearing 1 to the equal distribution operation position $P_3$, the conveyance mechanism 11 is displaced upward, so that the positional misalignment prevention members 13a, 13b are pulled out from the circumferential gaps. Also, the conveyance arms 12c. 12d are retreated from both sides of the ball bearing 1, and the conveyance mechanism 11 is further displaced in the direction of separating from the operating table 10 with respect to the direction perpendicular to the assembly line and is thus retreated from the operating table 10.

Figure 2E:
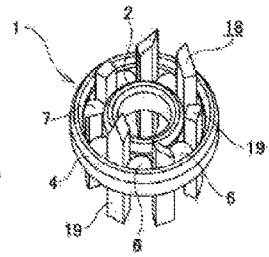
Figure 2F:
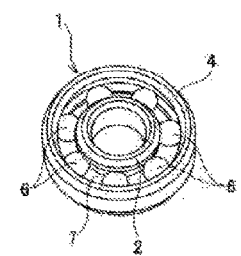
Figure 3:
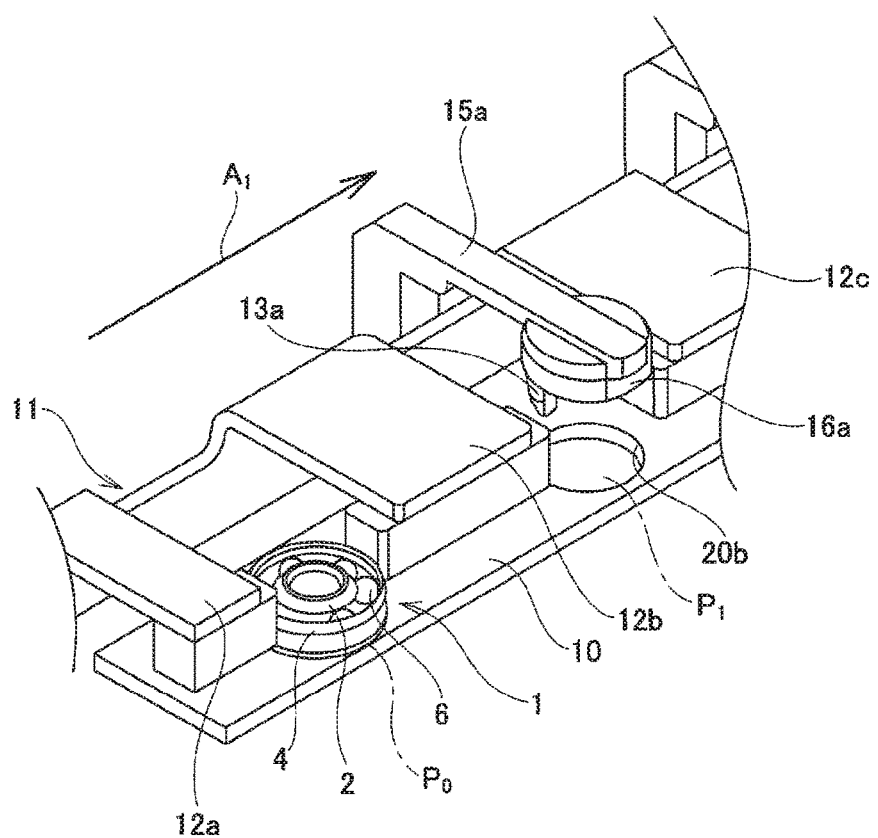
FIG. 3 is a perspective view depicting an aspect in which the ball bearing is conveyed to a ball collection operation position, in the example of the embodiment of the present invention.
Figure 4:
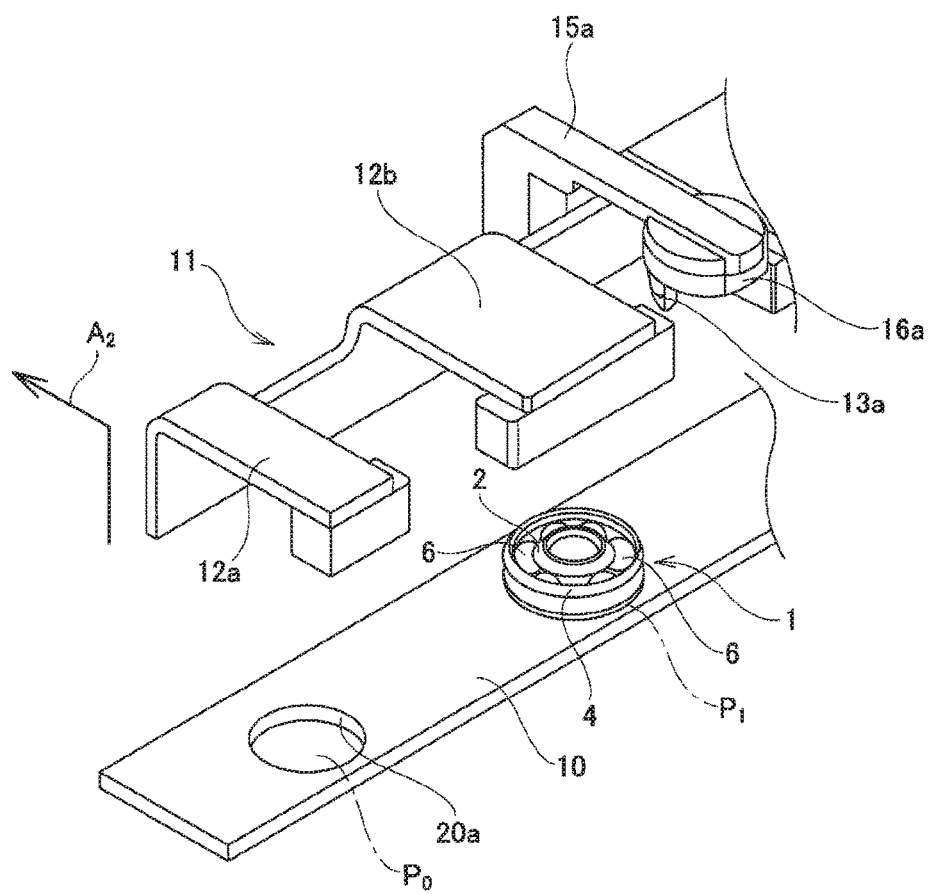
FIG. 4 is a perspective view depicting an aspect in which a conveyance mechanism is retreated after conveying the ball bearing to the ball collection operation position.

Subsequently, an equal distribution process of arranging the rolling elements 6, 6, which have been divided into the blocks each including the plurality of rolling elements 6 at the plurality of circumferential places in the rolling element mounting space 7, at equal intervals at a plurality of circumferential places in the rolling element mounting space 7 is implemented. As shown in FIG. 2E, the equal distribution process is performed by axially inserting teeth 19, 19 configuring a comb-shaped cylindrical equal distribution jig 18 into the rolling element mounting space 7. A circumferential dimension between circumferential side surfaces of the respective teeth 19, 19 is substantially the same as each diameter of the rolling elements 6, 6. A leading end face of each of the teeth 19, 19 is configured as an inclined surface (inclined in a mountain shape of which a circumferentially central part most protrudes or inclined upward toward one circumferential side or the other circumferential side) so as to guide the movement of the rolling elements 6, 6 in the rolling element mounting space 7 as the equal distribution jig 18 is inserted into the rolling element mounting space 7. Therefore, when the teeth 19, 19 configuring the equal distribution jig 18 are axially inserted into the rolling element mounting space 7, the rolling elements 6, 6 are moved in the rolling element mounting space 7 with being guided by the leading end faces of the respective teeth 19, 19. Then, as shown in FIG. 2F, the rolling elements are arranged at equal intervals at the plurality of circumferential places in the rolling element mounting space 7.

When the rolling elements 6, 6 are arranged at equal intervals in the circumferential direction, as described above, the teeth 19, 19 of the equal distribution jig 18 are thereafter pulled out from the rolling element mounting space 7. Then, the pair of cage elements 8, 8 is inserted into the rolling element mounting space 7 from both axial sides and is coupled by a plurality of rivets to configure the cage 9 and to rollably keep the rolling elements 6, 6, so that the ball bearing 1 is configured. When a crown-shaped cage is used as the cage, the crown-shaped cage is inserted from one axial opening of the rolling element mounting space and is incorporated.

According to the example as described above, when conveying the ball bearing from the ball collection operation position $P_1$ to the block division operation position $P_2$, and when conveying the ball bearing from the block division operation position P₂ to the equal distribution operation position P₃, the positional misalignment prevention members 13a, 13b are inserted into the circumferential gaps between the rolling elements 6, 6. Thereby, the rolling elements 6, 6 are prevented from being dispersedly scattered and positionally misaligned. That is, the positions of the rolling elements 6, 6 are restrained so that the rolling elements are not to be moved in the circumferential direction. For this reason, it is possible to implement the operation (the ball collection operation) of collecting the rolling elements 6, 6 to one circumferential place in the rolling element mounting space 7, the operation (the ball division operation) of dividing the rolling elements into blocks each including the plurality of rolling elements and the operation (the equal distribution operation) of arranging the rolling elements at equal intervals at the plurality of circumferential places, at the separate operation positions $P_1$ to $P_3$. Therefore, unlike Patent Document 1, it is possible to prevent the situation where an operation amount in the process of arranging the rolling elements unequally spaced in the rolling element mounting space, at equal intervals increases and the corresponding process becomes a bottle neck on the assembly line of the rolling bearing, so that it is possible to improve the assemblability of the ball bearing 1.

When implementing the embodiment described above, the positional misalignment prevention members 13a, 13b, the ball collection jig 14 and the block division jigs 17, 17 may be inserted into the rolling element mounting space 7 and the circumferential gaps in any vertical direction inasmuch as the direction is the axial direction of the ball bearing 1. For example, the insertion directions of the ball collection jig 14 and the positional misalignment prevention member 13a may be opposite to each other, and the ball collection jig 14 may be pulled out from the rolling element mounting space 7 and the positional misalignment prevention member 13a may be simultaneously inserted into the rolling element mounting space 7. Specifically, for example, when implementing the ball collection process, the ball collection jig 14 is inserted into the rolling element mounting space 7 from below through the circular hole 20a of the operating table 10. Then, in order to convey the ball bearing 1 to the block division operation position $P_2$, the conveyance mechanism 11 is displaced downward so as to be moved to a predetermined position. Accompanied by this, the leading end face (the upper end face) of the ball collection jig 14 is pressed by the leading end face (the lower end face) of the positional misalignment prevention member 13a to displace downward the ball collection jig 14, thereby pulling out the ball collection jig from the rolling element mounting space 7 and inserting the positional misalignment prevention member 13a into the rolling element mounting space 7. In this way, while pulling out the ball collection jig 14 from the rolling element mounting space 7, the positional misalignment prevention member 13a is at the same time inserted into the rolling element mounting space 7. Thereby, after the ball collection jig 14 is pulled out until the positional misalignment prevention member 13a is inserted, it is possible to securely prevent the rolling elements 6, 6 from rolling. Likewise, the insertion directions of the block division jigs 17, 17 and the positional misalignment prevention member 13b, 13b may be opposite to each other, and the block division jigs 17, 17 may be pulled out from the rolling element mounting space 7 and the positional misalignment prevention member 13b, 13b may be simultaneously inserted into the rolling element mounting space 7.

In the equal distribution process, the rolling elements 6, 6 are arranged at equal intervals in the circumferential direction and the positional misalignment prevention members are then inserted into the circumferential gaps between the respective rolling elements 6, 6. In this state, the ball bearing 1 may be conveyed to the next operation position, the positional misalignment prevention members may be removed, and the cage 9 may be incorporated.

In the example of the embodiment, the present invention is applied to the assembling operation of the radial ball bearing of the single-row deep groove ball type. However, the present invention is not limited to the ball bearing of the single-row deep groove ball type, and can also be applied to the radial rolling bearing such as an angular ball bearing, a tapered roller bearing, a cylindrical roller bearing and the like.

The method of conveying the rolling bearing along the assembly line is not limited to the method of using the conveyance mechanism 11, and the diverse methods known in the related art can also be used. For example, the rolling bearing can be conveyed by a variety of conveyors or a hanging-down or hanging-up type conveyance device configured to sandwich and convey the rolling bearing by a pair of arms.

The method of collecting the rolling elements to one circumferential place in the rolling element mounting space, the method of dividing and arranging the rolling elements into blocks each including the plurality of rolling elements, and the method of arranging the rolling elements at equal intervals are not limited to the above-described methods, and the diverse methods known in the related art can also be used. For example, like the method disclosed in Patent Document 1, the rolling elements (balls) may be collected to one circumferential place in the rolling element mounting space and divided into blocks each including the plurality of rolling elements by using a pair of arms.

In the example of the embodiment, the ball collection operation, the block division operation, and the equal distribution operation are individually implemented at the operation positions $P_1$ to $P_3$. However, the ball collection operation and the block division operation may be implemented at one operation position. In this case, after the ball collection operation and the block division operation are implemented at one operation position, the rolling bearing is conveyed to the next operation position with the positional misalignment prevention member being inserted in the circumferential gap between the rolling elements located at both the circumferential ends of each block and the equal distribution operation is then implemented. Also, the block division operation and the equal distribution operation may be implemented at one operation position. In this case, after the ball collection operation is implemented, the rolling bearing is conveyed to the next operation position with the positional misalignment prevention member being inserted in the circumferential gap existing at both the circumferential ends of the rolling elements collected to one circumferential place, and the block division operation and the equal distribution operation are implemented at one operation position. Also, after the ball collection operation is implemented, the rolling bearing may be conveyed to the next operation position with the positional misalignment prevention member being inserted in the circumferential gap existing at both the circumferential ends of the rolling elements collected to one circumferential place, and the block collection operation may be implemented without performing the ball division operation.

The method of equally distributing rolling elements of a rolling bearing can be applied to not only the rolling bearing but also a variety of machines (including an instrument of which power is to be manually fed). For example, the present invention can be widely applied to a vehicle including diverse mechanisms such as an electric power steering device, a machine tool, a home device and the like. The machine, the vehicle and the like obtained in this way can be configured at lower cost and with higher quality, as compared to the related art.

The subject application is based on Japanese Patent Application No. 2017-389 filed on Jan. 5, 2017, the contents of which are incorporated herein by reference.

DESCRIPTION OF REFERENCE NUMERALS

1: ball bearing
2: inner ring
3: inner ring raceway
4: outer ring
5: outer ring raceway
6: rolling element
7: rolling element mounting space
9: cage
13a, 13b: positional misalignment prevention member

The invention claimed is:

1. A method of equally distributing rolling elements of a rolling bearing by arranging a plurality of rolling elements at equal circumferential intervals in a rolling element mounting space between an inner ring raceway provided on an outer peripheral surface of an inner ring and an outer ring raceway provided on an inner peripheral surface of an outer ring,
wherein the method comprises:
collecting the rolling elements to one circumferential place in the rolling element mounting space; and
conveying the rolling bearing to a next process via a conveyance mechanism in a state where a positional misalignment prevention member of the conveyance mechanism is inserted in a circumferential gap existing between circumferential ends of the rolling elements collected to one circumferential place in the rolling element mounting space.

2. The method of equally distributing rolling elements of the rolling bearing according to claim 1,
wherein the rolling elements are balls.

3. A manufacturing method of a rolling bearing comprising using the method of equally distributing rolling elements of the rolling bearing according to claim 1.

4. A manufacturing method of a machine comprising using the method of equally distributing rolling elements of the rolling bearing according to claim 1.

5. A manufacturing method of a vehicle comprising using the method of equally distributing rolling elements of the rolling bearing according to claim 1.

6. A method of equally distributing rolling elements of a rolling bearing
by arranging a plurality of rolling elements at equal circumferential intervals in a rolling element mounting space between an inner ring raceway provided on an outer peripheral surface of an inner ring and an outer ring raceway provided on an inner peripheral surface of an outer ring,
wherein the method comprises:
dividing the rolling elements into blocks each including a plurality of rolling elements and arranging the blocks at a plurality of circumferential places in the rolling element mounting space; and
conveying the rolling bearing to a next process via a conveyance mechanism in a state where a positional misalignment prevention member of the conveyance mechanism is inserted in a circumferential gap existing between the rolling elements between circumferential ends of each block.

* * * * *